United States Patent [19]

Morris et al.

[11] 3,929,405

[45] Dec. 30, 1975

[54] COLOURATION PROCESS

[75] Inventors: Cyril Morris; Arthur Topham, both of Manchester, England

[73] Assignee: Imperial Chemical Industries Limited, London, England

[22] Filed: Aug. 8, 1973

[21] Appl. No.: 386,571

Related U.S. Application Data

[63] Continuation of Ser. No. 63,640, Aug. 13, 1970, abandoned.

[30] Foreign Application Priority Data

Aug. 18, 1969 United Kingdom............... 41059/69

[52] U.S. Cl. .................................. 8/39; 8/83; 8/94; 8/172; 8/174

[51] Int. Cl.² ......................................... C09B 1/00

[58] Field of Search .............. 8/172, 174, 94, 83, 39

[56] References Cited

UNITED STATES PATENTS

| | | | |
|---|---|---|---|
| 2,181,800 | 11/1939 | Crossley et al. | 8/79 AD X |
| 2,323,871 | 7/1943 | Kierle et al. | 8/62 |
| 3,034,847 | 5/1962 | Chapman | 8/94 X |
| 3,076,698 | 2/1963 | Orelup | 8/6 X |
| 3,081,140 | 3/1963 | Ford | 8/94 X |
| 3,120,508 | 2/1964 | Braun et al. | 260/161 |
| 3,129,053 | 4/1964 | Castle | 8/93 |
| 3,523,749 | 8/1970 | MacLeod et al. | 8/94 |
| 3,541,024 | 11/1970 | Weisz et al. | 8/174 X |

FOREIGN PATENTS OR APPLICATIONS

1,108,261   4/1968   United Kingdom...................... 8/94

*Primary Examiner*—Lewis T. Jacobs
*Attorney, Agent, or Firm*—Cushman, Darby & Cushman

[57] ABSTRACT

Process for colouring textile materials which comprises treating the textile material with a stable deflocculated dispersion of a dyestuff in an organic liquid and subsequently removing the organic liquid, the textile material being heated simultaneously with or subsequent to the treatment with the said dispersion.

6 Claims, No Drawings

COLOURATION PROCESS

This is a continuation, of application Ser. No. 63,640 filed Aug. 13, 1970, now abandoned.

This invention relates to an improved process for the colouration of polymeric materials.

It is known to colour polymeric materials in the form for example of textiles by treating them with solutions of colouring matters in organic solvents. Thus it is known to impregnate, e.g., in a continuous process, or to print textile materials with solutions of dyes in an organic solvent or mixture of such solvents, if necessary containing thickeners, to remove if desired a substantial part of the excess dye liquor, and then to fix the dyeing or print by a subsequent heat treatment. However, the choice of dyes and solvents for use in such processes is severely limited by the necessity for solubility of the dyestuff in the solvent at ambient or slightly above ambient temperatures and it is unusual to find sufficient solubility to obtain more than pale or medium depths of shade.

In particular when it is desired to use non-flammable chlorinated or fluorinated aliphatic hydrocarbons as the solvents, many available dyestuffs have such a low solubility in such solvents that only pale depths of shade can be obtained. Medium depths of shade can be obtained by such a process if an additional solvent is added to increase the solubility of the dyestuffs, but the use of the additional solvents frequently results in one or more of the following disadvantages: increased cost, explosion hazards, difficulty in recovery of the solvents, and adverse effect on fibre properties.

It is also known to dye textile materials from solutions of dyes in organic solvents by batchwise exhaustion methods but in this case the degree of exhaustion is usually very poor even when the dyestuff and solvent have been selected for the dye to have minimum solubility consistent with that required for this method of dyeing. The exhaustion may be improved by gradual addition during the dyeing process of an additional solvent to reduce the solubility of the dyestuff but this technique is troublesome and not practicable with the more acceptable solvents such as the non-flammable halogenated hydrocarbons.

By the process of the present invention a wide variety of colouring matters can be applied from organic solvent media by batchwise or continuous or printing procedures to give level fast shades which, if desired, can be obtained in heavy depths of shade.

According to the invention there is provided a process for the colouration of polymeric materials which comprises the steps in succession of treating the polymeric material with a stable deflocculated dispersion in an organic liquid of a colouring matter in fine particle size, and removing the organic liquid, the polymeric material being heated simultaneously with or subsequent to the treatment with the dispersion.

By colouration of polymeric materials there is meant the incorporation of colouring matters within the polymeric material including adsorption on to the surface of the polymeric material. There is not meant the mechanical attachment of colouring matters to the surface of the polymeric material by binding agents, as for example in pigment printing.

The polymeric materials are in any convenient form having a high surface area per unit volume, for example in filaments, fibres, textile materials comprising such filaments or fibres, films, ribbons or powders. As examples of polymeric materials there may be mentioned natural cellulosic fibres such as cotton, flax, hemp, jute, sisal and ramie, regenerated cellulosic fibres such as viscose and cuprammonium rayon, cellulose ester fibres such as cellulose acetate and triacetate, natural protein fibres such as wool, silk and mohair, regenerated proteins, synthetic polyamides for example nylons 66 and 6 and modified polyamides, polyesters for example polyethylene terephthalate and modified polyesters, polyacrylonitrile and modified polyacrylonitriles, polyurethanes, and materials such as leathers and skins.

By the term stable deflocculated dispersion is meant a dispersion in which a negligible proportion of approaches between the particles of the disperse phase results in adhesion between the particles.

Dispersions which are not stable deflocculated dispersions, even though of fine particle size, give rise to very uneven, specky dyeings.

The particles of the colouring matter should be less than 25 microns in size and are preferably less than 10 microns in size, by which is meant that in a dilute sample of the dispersion observed with a microscope a substantial majority of the particles should have an equivalent circle diameter below the stated limit.

The organic liquid may be any organic material which at the temperature used for the colouration is in the liquid state, does not dissolve or affect to an undesirable extent the chemical composition or physical form of the polymeric material, and which has such a limited solubility for the colouring matter that a significant part of the colouring matter is in the undissolved state at least at the commencement of the colouration process.

As examples of organic liquids which may be used, subject to their suitability for any particular polymeric material and colouring matter, there are mentioned alcohols such as methanol, n- and isobutanol, and furfuryl and tetrahydrofurfuryl alcohol, ketones such as cyclohexanone, esters such as butyl acetate, ethers such as dioxan, ethylene glycol monomethyl and monoethyl ether, hydrocarbons such as white spirit and xylene, and halogenated hydrocarbons such as chlorobenzene and 1:1:2-trichloro-1:2:2-trifluoroethane. The preferred organic liquids are hydrocarbons and halogenated hydrocarbons, especially, in view of their generally easy recovery and incombustibility, the lower aliphatic halogenohydrocarbons such as chloroform, carbon tetrachloride, 1:1:1-trichloroethane, trichloroethylene, dibromoethylene and, above all, tetrachloroethylene (perchloroethylene).

Mixtures of these liquids or mixtures of organic materials which are liquid under the conditions of the process of the invention may be used if desired. The presence of inorganic liquids, in particular water, can be tolerated as long as a significant part of the colouring matter is in the undissolved state in the organic liquid at the commencement of the dyeing process and the inorganic liquids do not have an adverse effect on the polymeric material.

As colouring matter there may be used any organic dyestuff or pigment having the necessary limited solubility in the organic liquid. As examples of these there are mentioned particularly disperse dyestuffs and water-soluble dyestuffs. These dyestuffs can be of any of the known dyestuff series, for example diarylmethane, triarylmethane, xanthene, azine, oxazine or thiazine dyestuffs, and especially azo, anthraquinone, nitro, phthalocyanine, methine, styryl, naphtoperinone, quinophthalone or 5-amino-8-hydroxy-1:4-naphthoquinoneimine dyestuffs.

By water-soluble dyestuffs are meant especially basic dyestuffs, i.e., dyestuffs which contain cationic groups, and the so-called acid and direct dyestuffs.

Preferred azo dyestuffs are monoazo and disazo dyestuffs and metallised derivatives thereof. As examples of these metallised azo dyes there may be mentioned those containing one atom of copper, chromium or cobalt bound to one molecule of a monoazo dye and those containing one atom of chromium or cobalt bound to two molecules of the same or different mono azo dyestuffs. Such metalled dyestuffs may optionally contain sulphonic acid or carboxylic acid water-solubilising groups.

Any of these dyestuffs may contain fibre-reactive groups, i.e., groups which are capable of forming a covalent bond with the fibre or other polymeric substrate.

The dyestuffs should be selected to have some affinity for the polymeric material to be coloured. Disperse dyes are in general suitable for colouration of polyesters, cellulose esters, nylon and modified polyacrylonitrile; acid dyes, direct dyes and reactive dyes for colouration of cellulosic materials and natural and synthetic polyamides; and cationic dyes for colouration of synthetic polyamides and modified polyacrylonitriles. When mixtures of polymeric materials are used in the process for example polyester/cotton or polyester/wool unions, then a suitable mixture of dyestuffs for colouring the separate components of the unions will be required. Examples of dyestuffs of these different classes are listed in the second edition of the Colour Index and the various supplements thereto.

The deflocculated dispersion required for use in the process of the invention may be prepared, for example, by milling or grinding the colouring matter in presence of the organic liquid and a deflocculating agent to prevent the particles of the solid from aggregating. Alternatively an autodispersible powder of the colouring matter may be stirred with the organic liquid in presence of a deflocculating agent, or the colouring matter may be 'flushed' into the organic liquid by extracting an aqueous suspension or paste of the colouring matter with the organic liquid in presence of a deflocculating agent or with subsequent addition of a deflocculating agent.

The deflocculating agents used to prepare the dispersions are preferably at least partly soluble in the organic liquid. As examples of deflocculating agents there may be mentioned polyureas essentially free from basic amino groups and which contain at least two urea groups and at least two alkyl, alkenyl or alkapolyenyl groups each of which contains at least 8 carbon atoms such as are described in our copending application U.S. Ser. No. 63,642, now U.S. Pat. No. 3,728,301.

The amount of colouring matter will depend for example on the depth of shade required, and the tinctorial strength and affinity of the colouring matter, but usually between 0.2 and 5% of colouring matter based on the weight of polymeric material is satisfactory, although more or less may be used if desired.

The amount of deflocculating agent used will depend upon the deflocculating efficiency of the agent in question on the colouring matter being applied, but, in general, amounts between 5 and 50% based on the weight of the colouring matter will be satisfactory, although amounts outside this range may be used if desired.

The process of the invention may be carried out by any conventional procedure for the colouration of polymeric materials by treatment with liquid media. For example in batchwise dyeing the polymeric material is agitated in the dispersion, which may conveniently, but not necessarily, have from 5 to 50 parts of organic liquid for each part of polymeric material, at a temperature conveniently between 50° and 175°C. When the desired depth of dyeing is obtained or exhaustion is substantially complete the polymeric material is removed from the dispersion and dried, optionally at elevated temperature to remove excess organic liquid. If desired a rinsing step in fresh organic liquid may be employed before drying.

In a continuous dyeing process the polymeric material may be for example passed through the dispersion and then passed through rollers to remove excess dispersion, dried and heated at a temperature for example from 80° to 220°C.

Similarly the dispersion may be applied to the textile material by spraying or by printing techniques.

When cellulose textile material are coloured with reactive dyestuffs by the process of the invention then the colouration is usually carried out in the presence of an alkaline agent, in which case the alkaline agent is also used in the form of a stable dispersion in an organic liquid.

If desired other dyeing auxiliaries may be present, especially auxiliaries which are soluble or dispersible in the organic liquid. In the case of dispersions applied by printing or padding methods it is sometimes advantageous to include thickeners, especially those having cellulose esters, polyvinyl esters, or polyvinyl alcohol as a base.

The use of organic liquids in particular halogenated aliphatic hydrocarbons instead of water as liquid medium for dyeing processes confers a number of advantages; dyeing is more rapid in exhaustion processes and wetting of the textile easier and pick up better in padding procedures; the organic liquids have lower specific heats and latent heats of evaporation than water, thus reducing costs of heating and drying and also permitting economic recovery of the organic liquid for reuse which avoids the increasingly severe difficulties being met in the treatment of aqueous effluents; furthermore a number of scouring or finishing treatments are carried out in non aqueous media and in suitable cases these can be integrated with the dyeing operation The invention is illustrated but not limited by the following examples in which all parts and percentages are by weight unless otherwise stated.

EXAMPLE 1

Three pieces of fabric, each weighing 2g (one piece each of polyethylene terephthalate, cellulose triacetate and nylon 66) are placed in a mixture of 0.6 cc of a dispersion of C.I. Disperse Blue 26 and 120 cc. of perchloroethylene at 20°C. The temperature is raised to the boiling point and held there for 1 hour. After rinsing with perchloroethylene and drying, the fabrics are strongly coloured.

The dispersion used above is prepared by the following procedure:

A mixture of 10 parts of 1:5-dihydroxy-4:8-di(methylamino) anthraquinone (C.I. Disperse Blue 26), 5 parts of the polyurea product prepared as described below and 163 parts of perchloroethylene is ball milled for 16 hours to give a finely divided well deflocculated dispersion.

The polymer used above is prepared by adding gradually a solution of 17.4 parts of an 80:20 mixture of 2:4- and 2:6-tolylene-diisocyanates in 39.5 parts of acetone to a solution of 37.2 parts of an alkylpropylene diamine of formula $R-NH-(CH_2)_3-NH_2$ wherein R represents an alkyl group derived from tallow, commercially available under the trade name Duomeen T (Duomeen is a Registered Trade Mark), in 158 parts of acetone at 48°C., and removing the acetone by distillation up to a temperature of 100°C. under reduced pressure.

EXAMPLE 2

The procedure of Example 1 is repeated using dispersions of 1-methylamino-4-β-hydroxyethylaminoanthraquinone (C.I. Disperse Blue 3) and 1:4-dihydroxy-5:8-di(β-hydroxyethylamino)anthraquinone (C.I. Disperse Blue 7) instead of the dispersion of 1:5-dihydroxy-4:8-di(methylamino) anthraquinone. The fabrics are strongly coloured.

The dispersions used above are each prepared by the following procedures:

A mixture of 10 parts of dyestuff, 5 parts of the polyurea product prepared as described below and 163 parts of perchloroethylene is ball milled for 16 hours to give a finely divided well deflocculated dispersion.

The polyurea product used above is prepared by gradually adding a solution of 73.7 parts of a commercially available 40% solution in butyl acetate of polymerised mixed 2:4- and 2:6-tolylene-diisocyanates containing 5.7% of isocyanate groups and less than 0.5% of free tolylene diisocyanate in 32 parts of acetone to a stirred solution of 53.5 parts of a fatty secondary amine derived from soya commercially available under the trade name Armeen 2S (Armeen is a Registered Trade Mark) in 118 parts of acetone at 50°–55°C. The acetone is then removed by distillation up to a temperature of 100°C. under reduced pressure.

Similar results are obtained if the above polyurea product used in the preparation of the dyestuff dispersions is replaced by the polyurea product obtained as described below:

This polyurea product is prepared by gradually adding a solution of 37.5 parts of a commercially available 50% solution in ethyl acetate of polymerised mixed tolylene diisocyanates of a low degree of polymerisation containing 8.5% of free tolylene diisocyanate and 11.2% of isocyanate groups in 15.8 parts of acetone to a stirred solution of 31.5 parts of a mixture of unsaturated amines, largely oleylamine, commercially available under the trade name Armeen O, in 87 parts of acetone and then removing the acetone by distillation up to a temperature of 100°C. under reduced pressure.

EXAMPLE 3

A piece of polyethylene terephthalate fabric (6 parts by weight) is dyed for 1 hour at the boil in a mixture of 1.07 parts of the dispersion of 1:5-dihydroxy-4:8-di(-methylamino)anthraquinone used in Example 1 and 195 parts perchloroethylene. A good uniform dyeing of the fabric results. When this procedure is repeated but using a dispersion prepared without use of the polyurea product a very uneven dyeing is obtained as the dispersion is not deflocculated.

A similarly good uniform dyeing also results when the above procedure is repeated using a dispersion of 1:4-diamino-5-nitroanthraquinone (C.I. Violet 8) prepared by the procedure described in Example 2 for preparation of a dispersion of 1-methylamino-4-β-hydroxyethylaminoanthraquinone.

EXAMPLE 4

A piece of polyethylene terephthalate fabric (6 parts by weight) is dyed for 1 hour at the boil (160°C) in a mixture of 92 parrs of white spirit and 0.78 part of a dispersion of 1:4-diamino-5-nitroanthraquinone. A good uniform dyeing results.

The dispersion used above is prepared by the following procedure:

A mixture of 10 parts of the dyestuff, 5 parts of the polyurea product prepared from Armeen 2S as described in Example 2 and 77 parts of white spirit is ball milled for 16 hours to give a finely divided deflocculated dispersion.

EXAMPLE 5

A piece of polyethylene terephthalate fabric is padded through a mixture of 10 parts of the dispersion of 1:5-dihydroxy-4:8-di(methylamino)anthraquinone used in Example 1 and 90 parts of perchloroethylene. After drying and then either steaming for 2 minutes at 180°C. or baking for 1 minute at 200°C. a good uniform dyeing is obtained, fast to washing.

Similar good uniform dyeings are obtained by this procedure using the dyestuff dispersions obtained as described in Example 2.

EXAMPLE 6

The procedure of Example 5 is repeated using a mixture of 20 parts of a dispersion of 2:4-dinitro-4'-hydroxydiphenylamine (C.I. Disperse Yellow 1) prepared as described below and 80 parts of perchloroethylene. A good uniform dyeing, fast to washing, is obtained.

A mixture of 10 parts of dyestuff, 1 part of the polyurea product prepared from Armeen 2S as described in Example 2 and 163 parts of perchloroethylene is ball milled for 16 hours to give a finely divided, well deflocculated, dispersion.

EXAMPLE 7

The procedure of Example 5 is repeated using a mixture of 10 parts of a dispersion of 4:8-diamino-1:5-dihydroxyanthraquinone prepared as described below and 90 parts of perchloroethylene and employing a baking treatment for 2 minutes instead of 1 minute at 200°C. A good uniform dyeing, fast to washing, is obtained.

The dispersion used above is obtained by the procedure described in Example 1 using 4:8-diamino-1:5-dihydroxyanthraquinone instead of C.I. Disperse Blue 26.

EXAMPLE 8

6 Parts of bulked nylon 66 fabric is placed in a dyebath containing 0.736 parts of a dispersion of the sodium salt of 1-amino-4-anilinoanthraquinone-2-sulphonic acid prepared as described below, 0.2 part of the isopropylamine salt of dodecylbenzenesulphonic acid, and 192 parts of perchloroethylene. The dyebath is then heated at the boiling point for 1 hour. During this time the dyebath is almost completely exhausted of dye. The fabric is then withdrawn, rinsed in perchloroethylene and dried. A deep blue dyeing is obtained.

The dispersion used above is prepared by ball milling a mixture of 10 parts of the sodium salt of 1-amino-4-anilinoanthraquinone-2-sulphonic acid, 5 parts of the polyurea product prepared as described below and 163 parts of perchloroethylene for 16 hours.

The polyurea product used above is prepared by gradually adding a solution of 29.8 parts of a commercially available 75% solution in ethyl acetate of an adduct from mixed tolylene diisocyanates and polyols and containing 14.1% of residual isocyanate groups in 16 parts of acetone to a stirred solution of 53.5 parts of Armeen 2S in 118 parts of acetone at 50°–55°C. and then removing the acetone by distillation at a temperature up to 100°C. under reduced pressure.

EXAMPLE 9

6 Parts of bulked nylon 66 fabric are placed in a dyebath containing 0.64 parts of a dispersion of 1-amino-4-anilinoanthraquinone-2-sulphonic acid prepared as described below and 192 parts of perchloroethylene. The dyebath is then heated at the boiling point for 1 hour. The fabric, which is dyed to a bright blue shade, is the withdrawn, rinsed in perchloroethylene and dried.

The dispersion used above is obtained by ball milling a mixture of 10 parts of 1-amino-4-anilino-anthraquinone-2-sulphonic acid, 5 parts of the polyurea product used in Example 8 and 163 parts of perchloroethylene for 16 hours.

EXAMPLE 10

3 Parts of each of a modified polyacrylonitrile fabric available under the trade name Courtelle (Courtelle is a Registered Trade Mark) and bulked nylon 66 fabric are placed in a dyebath containing 0.96 parts of a dispersion prepared as described below and 192 parts of perchloroethylene and dyeing carried out at the boiling point for 1 hour. The fabrics, which are dyed to yellow shades are then withdrawn, rinsed in perchloroethylene and dried.

The dispersion used above is prepared by ball milling a mixture of 10 parts of the dyestuff of formula I, 5 parts of the polyurea product used in Example 8 and 163 parts of perchloroethylene for 16 hours.

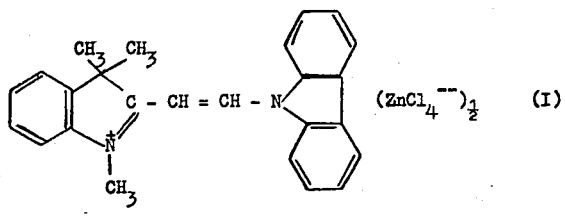

EXAMPLE 11

6 Parts of bulked nylon 66 fabric are placed in a dyebath containing 0.64 part of a dispersion of the sodium salt of 1-(2'-sulphon-N-methylanilidophenylazo)-2-amino-8-naphthol-6-sulphonic acid prepared as described below, 0.2 part of the isopropylamine salt of dodecylbenzenesulphonic acid and 192 parts of perchloroethylene. The dyebath is then heated slowly and held at the boiling point for 1 hour. The fabric is then withdrawn, rinsed in perchloroethylene, and dried. A bright bluish-red dyeing is obtained.

The dispersion used above is prepared by gravel milling a mixture of 10 parts of the dyestuff, 85 parts of perchloroethylene and 5 parts of the polyurea product prepared from Armeen 2S as described in Example 2.

EXAMPLE 12

10 Parts of polyethylene terephthalate fabric are dyed for 1 hour at the boil in a mixture of 1.6 parts of a dispersion of 1:4-bis(3'-methyl-4'-hydroxyphenylazo)benzene and 192 parts of perchloroethylene. The fabric is then rinsed in perchloroethylene and dried. A uniform yellow shade is obtained.

The dyestuff dispersion used in this Example was obtained by bead milling for 14 hours, 10 parts of the dyestuff, 5 parts of the polyurea product prepared from Armeen 2S as described in Example 2 and 145 parts of perchloroethylene.

EXAMPLE 13

6 parts of polyethylene terephthalate fabric are dyed for 1 hour at the boil (160°C) in a mixture of 48 parts of white spirit and 0.6 part of a dispersion of 2-methyl-4-(di-β-hydroxyethylamino)-2'-chloro-4'-(N-β-chloroethylsulphonamido)azobenzene. A deep uniform scarlet dyeing is obtained.

The dyestuff dispersion used in this Example was obtained by ball milling for 16 hours a mixture of 10 parts of the dyestuff, 5 parts of the polyurea product prepared from Armeen 2S as described in Example 2 and 85 parts of white spirit.

EXAMPLE 14

In place of the 0.6 part of the dyestuff dispersion used in Example 13 there is used 0.96 part of a dispersion of 2-methyl-4-(di-β-hydroxyethylamino)-4'-nitroazobenzene whereby a deep uniform red dyeing is obtained.

This dyestuff dispersion was obtained by ball milling for 16 hours a mixture of 10 parts of the dyestuff, 5 parts of the polyurea product prepared from Armeen 2S as described in Example 2 and 145 parts of perchloroethylene.

EXAMPLE 15

10 parts of bulked nylon 66 fabric are dyed for 1 hour at the boil in a mixture of 160 parts of perchloroethylene and 1.6 part of a dispersion of 2-methyl-4-(di-β-hydroxyethylamino)-2'-chloro-4'-(N-β-chloroethylsulphonamido)azobenzene. A deep uniform scarlet dyeing is obtained.

The dyestuff dispersion was obtained by ball milling for 16 hours a mixture of 10 parts of the dyestuff, 5 parts of the polyurea product prepared from Armeen 2S as described in Example 2 and 145 parts of perchloroethylene.

Polyethylene terephthalate staple fabric can be similarly dyed in scarlet shades by the above dyeing procedure.

EXAMPLE 16

A piece of nylon 66 locknit fabric is padded through a mixture of 115 parts of a dispersion of 2-methyl-4-(di-β-hydroxyethylamino)-2'-chloro-4'-(N-β-chloroethylsulphonamido)azobenzene and 885 parts of perchloroethylene, and the fabric is then passed between rollers. The fabric is dried and is then either steamed for 15 minutes at 100°C. or baked for 2 minutes at 200°C. The fabric is then rinsed in perchloroethylene and is finally dried. In each case, a uniform scarlet dyeing of good wet fastness properties is obtained.

The dyestuff dispersion was obtained by ball milling for 16 hours a mixture of 10 parts of the dyestuff, 1 part of the polyurea product prepared from Armeen 2S as described in Example 2, and 150 parts of perchloroethylene.

A uniform yellow dyeing of good wet fastness properties is obtained if the above dyestuff is replaced by an equal amount of 2-hydroxy-5-methyl-4'-[2''-chloro-4''-(di-β-hydroxyethylamino)-1'':3'':5''-triazin-6''-ylamino]azobenzene.

EXAMPLE 17

In place of the 1.6 part of the dyestuff dispersion used in Example 15 there is used 1.6 part of a dispersion of 1:4-bis(γ-chloro-β-hudroxypropylamino)anthraquinone whereby a uniform blue dyeing is obtained. If the dyeing process is carried out for 1 hour at 150°C. in a sealed vessel instead of for 1 hour at the boil (121°C), then a deeper dyeing is obtained.

The dyestuff dispersion used in this Example was obtained by the method described in Example 15 using an equal amount of the blue dyestuff.

EXAMPLE 18

A piece of bleached Indian Head cotton fabric is padded through a mixture comprising:

| | |
|---|---|
| Dispersion of the disodium salt of 1-(dichloro-triazinylamino)7-phenylazo-8-naphthol-3:6-disulphonic acid | 10 parts |
| Dispersion of sodium bicarbonate | 10 parts |
| Perchloroethylene | 80 parts |
| | 100 parts | and the fabric is then passed through rollers. The fabric is dried, is then steamed for 5 minutes at 100°C., and is finally washed in a dilute aqueous solution of soap at 100°C. A uniform red dyeing of excellent wet fastness properties is obtained.

The dyestuff dispersion was obtained by ball milling for 16 hours a mixture of 10 parts of the dyestuff, 0.75 part of the polyurea product prepared from Armeen 2S as described in Example 2 and 90 parts of perchloroethylene.

The sodium bicarbonate dispersion was obtained by ball milling for 16 hours a mixture of the polyurea product prepared as described in Example 8 and 88 parts of perchloromethylene.

In place of the 10 parts of the sodium bicarbonate dispersion used in Example 18 there are used 10 parts of a dispersion of sodium carbonate or 10 parts of a dispersion of sodium hydroxide when similar red dyeings are obtained.

The dispersions of sodium carbonate and sodium hydroxide were prepared in similar manner to the sodium bicarbonate dispersion.

EXAMPLE 19

A piece of bleached Indian Heat cotton fabric is padded through a mixture comprising:

| | |
|---|---|
| Dyestuff dispersion described in Example 15 | 16 parts |
| Sodium carbonate dispersion described in Example 18 | 36.4 parts |
| Dispersion of urea | 291 parts |
| Perchloroethylene | 20 parts |
| | 363.4 parts | and the fabric is then passed between rollers so that it retains 1.6 times its weight of the above mixture. The fabric is dried and is then baked for 1 minute at 200°C. The fabric is then washed in a hot dilute aqueous solution of soap and is then dried. A uniform scarlet dyeing of excellent wet fastness properties is obtained.

The urea dispersion was obtained by ball milling for 16 hours a mixture of 200 parts of urea, 12 parts of the polyurea product prepared from Armeen 2S as described in Example 2 and 588 parts of perchloroethylene.

EXAMPLE 20

A piece of polyethylene terephthalate fabric is padded through a mixture of 25 parts of a dispersion of 3-methyl-4-[6'-thiocyanobenzthiazol-2'-ylazo]-N:N-di(β-acetoxyethyl)aniline and 475 parts of perchloroethylene. The fabric is dried and is then baked for 1 minute at 200°C. The fabric is then rinsed in an emulsion comprising 10 parts of water, 10 parts of coconut oil diethanolamide and 980 parts of perchloroethylene and is finally dried. A uniform red dyeing fast to washing, to rubbing and to dry heat treatments, is obtained.

The dyestuff dispersion was obtained by ball milling for 16 hours a mixture of 100 parts of the dyestuff, 6.25 parts of the polyurea product prepared as described in Example 1 and 894 parts of perchloroethylene.

A blue dyeing is obtained if the dyestuff used in this Example is replaced by an equal amount of 2-acetylamino-4-[N-β-methoxyethoxycarbonyl)ethylamino]-5-methoxy-2':4'-dinitro-6'-chloroazobenzene.

EXAMPLE 21

A piece of nylon 66 locknit fabric is padded through a mixture of 16.7 parts of a dispersion of the sodium salt of 1-phenyl-3-methyl-4-[2'-sulpho-5-benzoylaminophenylazo]-5-pyrazolone and 983 parts of perchloroethylene, and is then passed between rollers. The fabric is dried and is then steamed for 7 minutes at a pressure of 20 lb. per sq. inch. The fabric is then rinsed in water and dried. A yellow dyeing of good wet fastness properties is obtained.

The dyestuff dispersion was obtained by ball milling for 16 hours a mixture of 10 parts of the dyestuff, 1 part of the polyurea product obtained from Armeen 2S as described in Example 2 and 150 parts of perchloroethylene.

EXAMPLE 22

A piece of polyethylene terephthalate/cotton (50:50) union fabric is padded through a mixture of 50 parts of the red dyestuff dispersion used in Example 20 and 950 parts of perchloroethylene. After passing between rollers and then drying, the fabric is baked for 2 minutes at 200°C. The fabric is then rinsed in perchloroethylene and is dried. The polyester portion of the fabric is dyed a uniform red shade while the cotton portion is only slightly stained.

EXAMPLE 23

In place of the 10 parts of the dyestuff dispersion used in Example 5 there are used 10 parts of a dispersion obtained by milling together 10 parts of 1:5-dihydroxy-4:8-di(methylamino)anthraquinone, 163 parts of perchloroethylene and 5 parts of the polymeric product obtained by esterifying polyhydroxystearic acid with glycidylmethacrylate, condensing the ester with a mixture of vinyltoluene and styrene, and finally esterifying with p-aminobenzoic acid by the procedure described in Example 9 of British Specification No. 1,108,261 except that the p-nitrobenzoic acid is replaced by an equivalent amount of p-aminobenzoic acid. A uniform blue dyeing is obtained.

What we claim is:

1. A process for coloring polyester textile material comprising treating said textile material with a stable deflocculated dispersion of a finely divided disperse dyestuff in a halogenated aliphatic hydrocarbon which contains dissolved therein as a deflocculating agent polyureas which are essentially free from basic amino groups and which contain at least two urea groups and at least two alkyl, alkenyl or alkapolyenyl groups, each of which contains at least 8 carbon atoms, said polyureas being the reaction product of a polyisocyanate and an amine containing said alkyl, alkenyl or alkapolyenyl groups and then removing the halogenated aliphatic hydrocarbon, the said textile material being heated to a temperature between 50°–220°C simultaneously with or subsequent to the treatment with the dispersion.

2. The process of claim 1 wherein the halogenated hydrocarbon is perchloroethylene.

3. The process of claim 2 wherein the polyester is polyethylene terephthalate; the dyestuff is 1:5-dihydroxy-4:8-di(methylamino) anthraquinone and the deflocculating agent is a condensate of a mixture of 2:4- and 2:6- tolylene diisocyanates with a compound of the formula $R-NH-(CH_2)_3NH_2$ wherein R represents an alkyl group derived from tallow.

4. The process of claim 1 wherein said textile material being heated is heated to a temperature between 50° and 175°C.

5. The process of claim 1 wherein said textile material being heated is heated to a temperature between 80°–220°C.

6. The process of claim 1 wherein said polyureas are the reaction product of a mixture of 2:4- and 2:6-tolylene diisocyanates with an amine selected from the group consisting of (1) a compound of the formula $R-NH-(CH_2)_3NH_2$ wherein R represents an alkyl group derived from tallow and (2) a fatty secondary amine derived from soya.

* * * * *